Nov. 26, 1940. D. R. TRINKLE Re. 21,639

FILTER

Original Filed May 24, 1935 2 Sheets-Sheet 1

Nov. 26, 1940. D. R. TRINKLE Re. 21,639

FILTER

Original Filed May 24, 1935 2 Sheets-Sheet 2

INVENTOR

Dallas R. Trinkle

Reissued Nov. 26, 1940 Re. 21,639

UNITED STATES PATENT OFFICE 21,639

FILTER

Dallas R. Trinkle, Oakland, Calif., assignor to Oliver United Filters Incorporated, San Francisco, Calif., a corporation of Nevada Original No. 2,087,708, dated July 20, 1937, Serial No. 23,278, May 24, 1935. Application for reissue July 11, 1939, Serial No. 283,845

26 Claims. (Cl. 210—183)

This invention relates to a filter, particularly to one useful for brightening fluids. The filter of the present invention is of the internal bed type although certain features are useful in external bed filters as well as plate filters.

It is a feature of this invention that a filter bed is provided upon which is deposited a cake of a filter aid. This cake can be of a sizable depth so that, during the period of the filtration operation, a continuous cut can be taken off the cake without destroying the cake. Thus in filtering a fluid as wine I have found an advantageous procedure to include first building up the cake on the filter and then filtering the wine through the preformed cake. As the wine is filtered, the solids removed build up on the cake. To maintain filtration rate I cut off a slight depth of the preformed cake, simultaneously taking off the deposit. If desired the incoming fluid can carry some filter aid to renew the cake.

It is an object of this invention to provide a new and improved filter structure.

Another object of the invention is to provide a novel method of filter operation.

Another object of the invention is to provide a filter of the internal type upon which a deep filter cake can be built and to which the cake will adhere even if flow and pressure fall to zero.

A further object of the invention is to provide an internal bed type filter with means for controlling the depth of bed and the character of bed maintained.

An additional object is to provide a filter of the internal type which will operate at high pressure even in the presence of abrasive filter aid materials.

Another additional object is to provide an improved filter bed construction.

A further object is to provide a filter particularly suited for brightening.

The invention possesses other features and objects of advantage, some of which, together with the foregoing will appear hereinafter wherein a preferred form of filter structure is disclosed.

In the drawings accompanying and forming a part of this specification Figure 1 is a side elevation, partly in section showing the filter construction.

Figure 1:
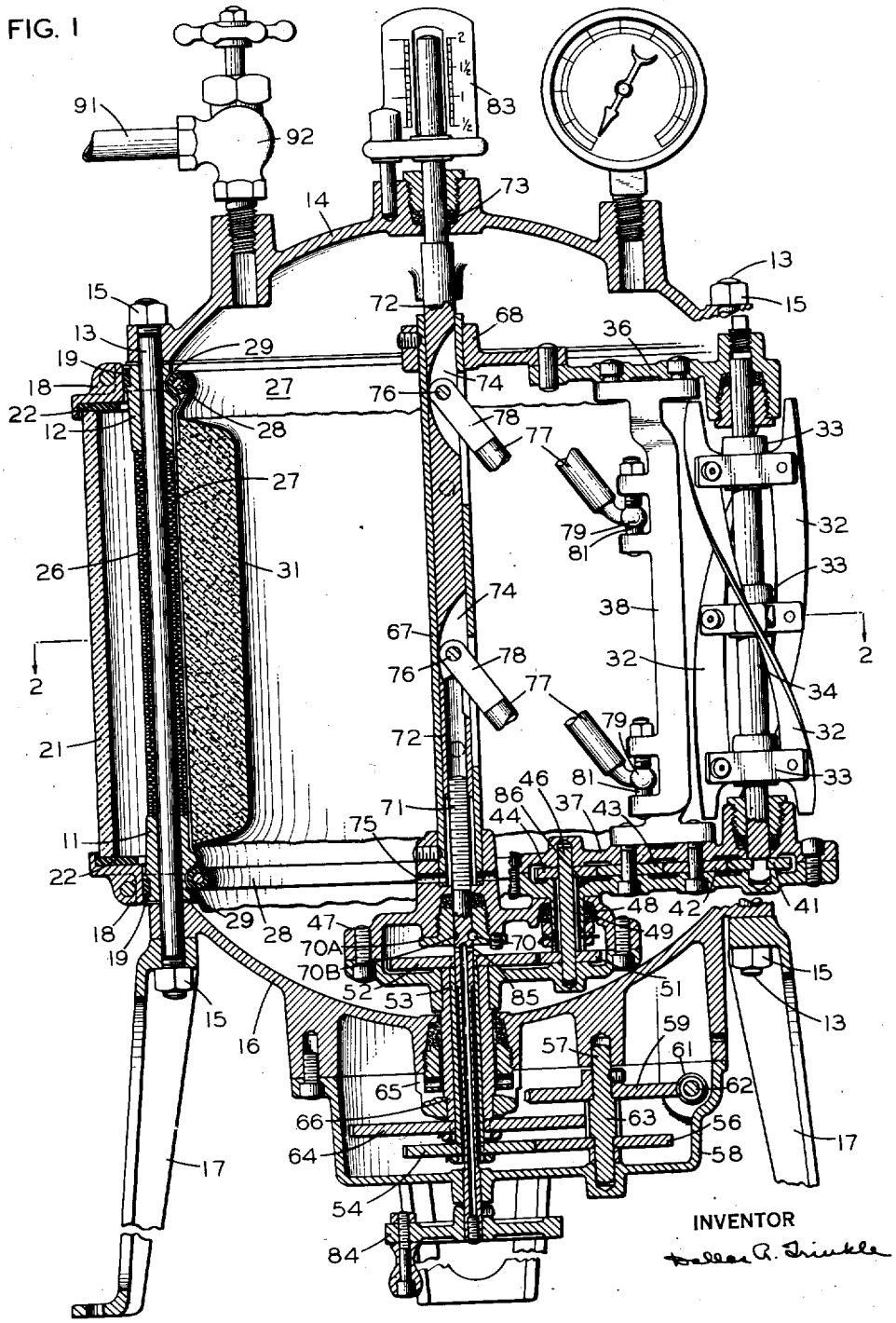

Before proceeding to discuss the methods of the present invention I will disclose the filter utilized in connection therewith.

A bottom ring 11 and a top ring 12 are joined together by a plurality of rods 13 which with nuts 15 secure the filter together, including top 14 and bottom 16. Legs 17, held by the rods, are spaced about the bottom to support the filter. Flanged split rings 18 and gaskets 19 at the top and bottom ring provide a support for a casing 21. This casing, carried on resilient washers 22, can be made of glass so the effluent fluid can be examined visually as it leaves the filter. Utilizing the split rings 18, connected and drawn together by studs 20, the outer casing 21 can be readily removed and replaced. Loosening the split rings permits the whole casing structure to be removed by slipping the structure over rings 11 and 12. The studs 20, and the structure disclosed, permit the casing to be independent of the filter bed and the compression therein.

Figure 3:
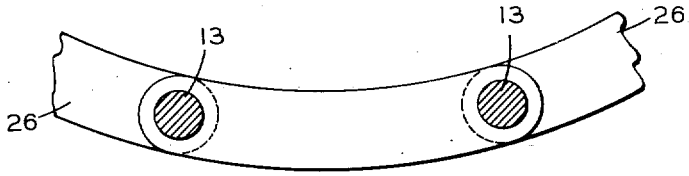
Figures 3 and 4 are views illustrating details of the unit used in connection with the filter bed structure.
Figure 4:
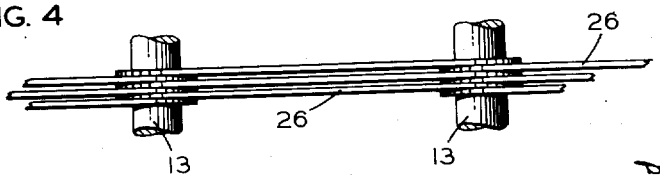

Means are provided for supporting a filter cake and, in accordance with this invention, said means are of a novel construction and include numerous advantages. As appears in Figures 3 and 4, I provide a plurality of flat strips 26 having, in the form disclosed, arcuate faces so that, when assembled, they form a circular body. The strips are placed on the rods (Figure 4) so that adjacent strips on the same rods are spaced by other strips, a staggered relation existing between adjacent strips on different rods. The strips are made of a metal suitable for the fluid treated. They provide a rigid body for a bed, one easily assembled, of low cost and easily duplicated.

It is a feature that a filter cloth, screen or paper 27 will adhere closely to this bed and, when a cake is built up, it will stand thereon even if the fluid is removed. The cloth 27 is held in place by rubber covered spring rings 28 cooperating with grooves 29 in bottom ring 11 and top ring 12. By using the particular bed, expansion under a high filtering pressure is avoided. The cake therefore does not crack nor break since it is not worked by its support expanding or contracting. Further, the pressure being on the inside, permits of simplified construction for the external casing need stand but a few pounds pressure. This latter point is emphasized when it is indicated that I have used a glass cylinder with a filter pressure of 200 pounds per square inch.

To control the nature and depth of cake 31 deposited on cloth 27, I provide means for cutting off cake. This means includes cutting means provided by arcuate blades 32 carried by spiders 33 on rod 34. The rod 34 is mounted for rotation in sealed bearings in an arm 36 and an arm 37. These arms are secured together by a member 38 so that the cutter can rotate freely.

Means are provided for rotating the cutter. This means includes a gear 41 on rod 34 driven through idler gears 42 and 43 which are in turn driven by gear 44 on a shaft 46, which extends into a housing 47. The arm 37 encloses the aforesaid gears while it is rotatable on housing 47. The arm includes an extension 48 which extends into housing 47 and is sealed therein by a packing gland 49. A gear 51 on shaft 46 in housing 47 is in turn driven through a drive including gear 52 on hollow shaft 53 which extends to the exterior of the filter to carry gear 54 driven by gear 56 on shaft 57 supported between housing 58 and bottom 16. A gear 59 on shaft 57 is driven by a worm 61 on motor shaft 62. Rotation of the motor shaft results in rotation of the cutting means.

Means are also provided for rotating the cutting means about the interior of the filter to remove cake from the bed therein. This means includes a drive from the shaft 57, gear 63 thereon driving a large gear 64 which is carried on an end of hollow shaft 66, this shaft surrounding part of shaft 53 and engaging housing 47 to rotate that housing. A tube 67 is secured to housing 47 and to an arm 68 upon which arm 36 is hinged so that the whole assembly can be rotated while the cutter is rotating, the two rotating in the same direction usually.

Shaft 66 is supported by U-member 65 which extends across housing 58 to support the shaft and take up end thrust.

Means are provided for adjusting the cutter position even in use. This means includes a threaded rod 71 extending through housing 58, the hollow shafts and housing 47. The end of this rod is threaded into a member 72 in tube 67, member 72 extending through top 14 and a gland 73 therein. The tube 67 and member 72 are slotted as at 74 and pins 76 support rods 77 therein, the rods having flats 78 fitting in the slots. The other end of the rods carry balls 79 which are engaged in receptacles 81 on the member 38. When the member 72 is moved up or down the member 38, and consequently the cutter, is moved away from or toward the cake 31. Rod 71 is supported by pin 70 in nut 70A, the rod having a groove 70B therein engaging the pin during rotation of the rod. Passages 75 permit member 72 to descend even though solids have worked in beneath the member.

A gage 83 on the top 14 cooperates with member 72 and enables an operator to judge the depth of the permissible cake as well as the change in the radial cutter position. This change is readily effected by holding wheel 84 on rod 71 while the motor is turning the structure, thus rotating rod 71 relative to member 72, or by rotating wheel 84 in the same direction but at a faster rate than that at which the motor rotates it.

It is to be noted that the glands adequately protect all bearings and that all heavy running parts can be lubricated from the exterior. In this connection, rod 71 is hollow and includes an outlet 85 into housing 47 so lubricant can be forced into that housing and into arm 37 through passage 86, shaft 46 having radial clearance to permit lubricant passage. Any leakage into the mechanism will force lubricant out of the hollow rod thus giving a check on the operating condition of the unit.

Figure 2:
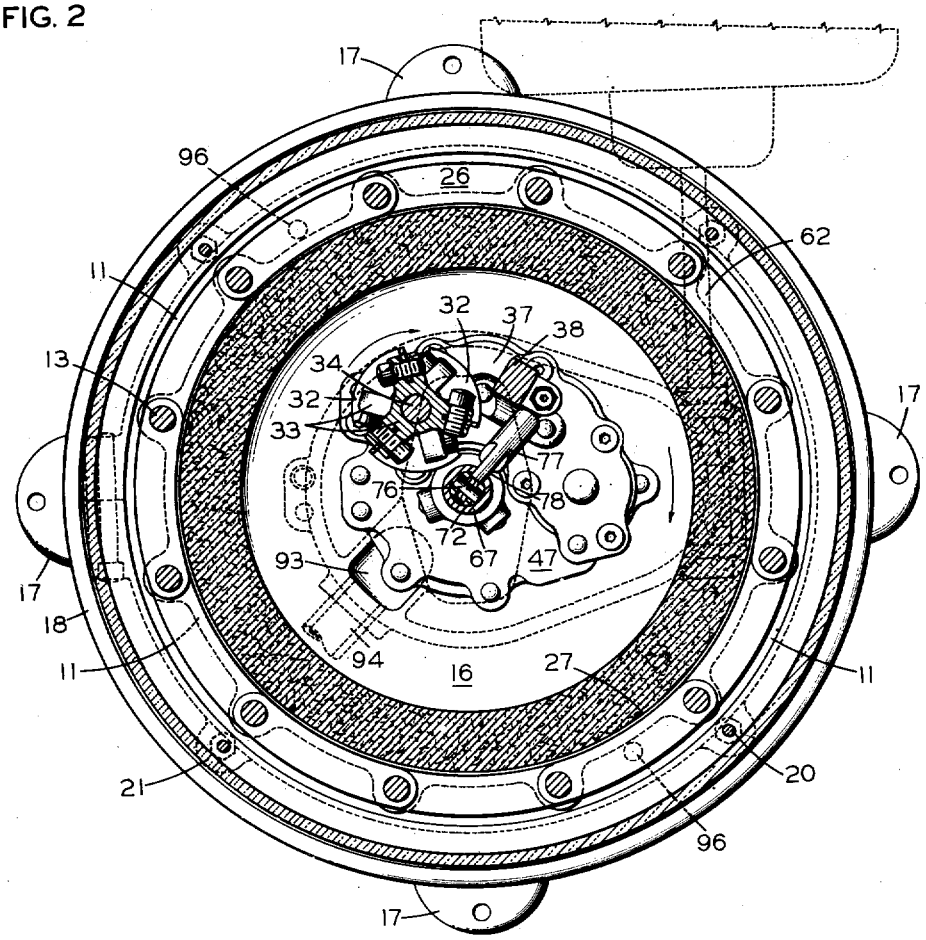
Figure 2 is a section taken under line 2—2 of Figure 1.

In operation, a cake of the desired depth is preferably first built up on the cloth, after which the cutter can be used to prevent it from increasing. Fluid is introduced through line 91 and valve 92. The clear effluent passes through to the space between the bed and the casing and is drawn off through outlets 96 while excess cake is cut off and collects in the bowl of bottom 16. The cake is prevented from packing by the rotation of housing 47 so it can be removed through outlet 93 and line 94 (Figure 2).

The cake can be made up initially of a filter material as a filter-aid or of the solids in the fluid. Depending upon the fluid, various materials can be used (asbestos, wood pulp and diatomaceous earth) as the bed, cutting off a small portion of the bed each cutter rotation. In some cases I add a small quantity of the earth to the incoming wine stream (or other fluid) to renew the bed. Advantage has been found in first filtering some fluids through a preliminary filter, a rough filter, and then forcing the fluid under high pressure through the filter of this invention. The cost involved is slight for the additional operation is simple and the power cost low for a stationary bed is used, only the cutter mechanism revolving.

I claim:

1. In a filter, a stationary cylindrical filter bed to support a filter cake on the inside thereof, a cutter, means for moving said cutter toward said cake or away from said cake, and means for simultaneously rotating said cutter about its own axis and the axis of said bed and over said cake to cut a peripheral portion from said cake.

2. In a filter, a stationary cylindrical filter bed to support a filter cake on the inside thereof, a cutter, means for moving said cutter toward said cake or away from said cake, and means for rotating said cutter over said cake to cut a peripheral portion of said cake.

3. In a filter, a cylindrical filter bed to support a filter cake on the inside thereof, a cutter, cutter support means, means for moving said cutter toward said cake or away from said cake, means for rotating said cutter support means over said cake to cut a peripheral portion of said cake and means for rotating said cutter relative to said support means during rotation of said support means.

4. In a filter, a cylindrical bed for supporting a filter cake, a housing structure extending through said bed substantially axially, a cutter, means supporting said cutter on said housing, for oscillation with respect to said housing, means extending into said housing for moving said cutter with respect to said housing, a screw extending into said housing and engaging said moving means for moving said support means to oscillate said cutter with respect to said housing toward and away from said bed to cut said cake selectively, and means for rotating said cutter about the axis of said cylindrical bed and over the surface of the cake on said bed to cut cake therefrom.

5. In a filter, a cylindrical bed for supporting a filter cake, a housing structure extending through said bed substantially axially, a cutter, means supporting said cutter on said housing for oscillation with respect to said housing, means extending into said housing for moving said support means to oscillate said cutter with respect to said housing toward and away from said bed to cut said cake selectively, and means for rotating said cutter about the axis of said cylindrical bed and over the surface of the cake on said bed to cut cake therefrom.

6. In a filter, a cylindrical bed, a housing structure extending through said bed substantially axially, a cutter, means supporting said cutter on said housing for oscillation with respect to said housing, means extending into said housing for moving said support means to oscillate said cutter with respect to said housing toward and away from said bed, and means for rotating said housing to carry said cutter over said bed to cut a cake thereon.

7. In a filter, a cylindrical bed, a housing structure extending through said bed substantially axially, a cutter, means supporting said cutter on said housing for oscillation with respect to said housing, means extending into said housing for moving said support means to oscillate said cutter with respect to said housing toward and away from said bed, and means for rotating said cutter to cut a cake on said bed.

8. In a filter, a cylindrical bed, a housing structure extending through said bed substantially axially, a cutter, means supporting said cutter on said housing for oscillation with respect to said housing, means extending into said housing for moving said support means to oscillate said cutter with respect to said housing toward and away from said bed and means for simultaneously rotating said cutter and said housing to carry said cutter over said bed to cut a cake thereon.

9. In a filter, a filter bed support formed of a plurality of parallel but spaced rods, and a plurality of substantially identical flat strip members engaged on at least two of said rods and spaced apart by like strip members engaged on one of said two rods and a rod other than one of said two rods, end closures carried upon said rods, and screw means on said rods for drawing said closures and said strips together to form a compact structure.

10. A structure as in claim 9 in which said rods are arranged in a circle and said strips are arcuate to form a circular filter bed.

11. In a filter, a bed support formed of a plurality of strip members placed one adjacent the other and spaced apart, one from the next, by another plurality of like strip members placed one adjacent the other with ends thereof extended between strip members of said first plurality, a plurality of rods extended through and joining said strip members together to provide a continuous filter bed, end closures positioned on said rods, and screw means for drawing said closures and said members together.

12. A pressure filter comprising a filter bed made up of a plurality of substantially like flat strip members positioned with flat faces of adjacent members lying adjacent to and parallel with each other but spaced from each other by ends of like flat members similarly placed with said ends between said adjacent members so said adjacent members are spaced apart to provide multiple passageways through said bed, and a flexible filter element positioned on a face of said bed.

13. A pressure filter comprising a tubular filter bed made up of a plurality of substantially like flat strip members positioned with flat faces of adjacent members lying adjacent to and parallel with each other but spaced from each other by ends of like flat members similarly placed with said ends between said adjacent members so said adjacent members are spaced apart to provide multiple passageways through said bed, and a flexible filter element positioned on the interior face of said bed.

14. A filter comprising a cylindrical filter bed, a flexible filter element on the interior of said cylindrical bed to support a filter cake on said bed, a casing for said bed, a cutter, drive means for said cutter extending through said casing to rotate said cutter, means for supporting said cutter, means for moving said cutter in said support means radially toward and away from a cake on said bed to vary cake depth, and means extending through said casing for operating said moving means.

15. A filter comprising a cylindrical filter bed, a flexible filter element on the interior of said cylindrical bed to support a filter cake on said bed, a casing for said bed, a cutter, drive means for said cutter extending through said casing to rotate said cutter, means for supporting said cutter, means extending through said casing for rotating said cutter support means, means for moving said cutter in said support means radially toward and away from a cake on said bed to vary depth, and means extending through said casing for operating said moving means.

16. A filter comprising a cylindrical filter bed, a flexible filter element on the interior of said cylindrical bed to support a filter cake on said bed, a casing for said bed, a cutter, means for supporting said cutter, means extending through said casing for rotating said cutter support means, means for moving said cutter in said support means radially toward and away from a cake on said bed to vary cake depth, and means extending through said casing for operating said moving means.

17. A filter comprising a casing, a cylindrical filter bed therein to support a filter cake therein on the interior of said bed, a rotatable cutter, central support means extending axially of said cylindrical bed, means hinged on and extending from said support means to support said cutter, means carried by and extending between said central support means and said extending means to move said extending means to move said cutter radially toward and away from said cake, and means extending through said casing to operate said moving means.

18. A filter comprising a casing, a cylindrical filter bed therein to support a filter cake therein on the interior of said bed, a rotatable cutter, central support means extending axially of said cylindrical bed, means for rotating said central support means, means hinged on and extending from said support means to support said cutter, means carried by and extending between said central support means and said extending means to move said extending means to move said cutter radially toward and away from said cake, and means extending through said casing to operate said moving means.

19. A filter comprising a casing, a cylindrical filter bed therein for supporting a cake on the inside face thereof, a central support means extending axially of said bed including a housing, means for supporting said support means rotatably in said casing, a cake cutter, cutter support means hinged on said central support means, cutter drive means in said housing, means extending through said casing for rotating said central support means, and means extending through said casing for rotating said cutter drive means in said housing.

20. A filter comprising a casing, a cylindrical filter bed therein for supporting a cake on the inside face thereof, a central support means extending axially of said bed including a housing, means for supporting said support means rotatably in said casing, a cake cutter, cutter support means hinged on said central support means, means for moving said hinged cutter support means relative to said central support means to move said cutter radially toward and away from a cake, cutter drive means in said housing, means extending through said casing for rotating said central support means, and means extending through said casing for rotating said cutter drive means in said housing.

21. A filter comprising a casing, a cylindrical filter bed therein for supporting a cake on the inside face thereof, a central support means extending axially of said bed including a housing, means for supporting said support means rotatably in said casing, a cake cutter, cutter support means hinged on said central support means, means for moving said hinged cutter support means relative to said central support means to move said cutter radially toward and away from a cake, including a member movable axially of said central support means and means joining said member and said cutter support means, cutter drive means in said housing, means extending through said casing for rotating said central support means, and means extending through said casing for rotating said cutter drive means in said housing.

22. A filter comprising a casing, a cylindrical filter bed therein for supporting a cake on the inside face thereof, a central support means extending axially of said bed including a housing, means for supporting said support means rotatably in said casing, a cake cutter, cutter support means hinged on said central support means, means for moving said hinged cutter support means relative to said central support means to move said cutter radially toward and away from a cake, including a member movable axially of said central support means and means joining said member and said cutter support means, means for moving said movable member from outside said casing, cutter drive means in said housing, means extending through said casing for rotating said central support means, and means extending through said casing for rotating said cutter drive means in said housing.

23. A pressure filter comprising a tubular filter bed including a plurality of spaced rods arranged parallel to each other and equidistant from a common axis, and a plurality of substantially like flat strip members positioned on two of said rods with flat faces of adjacent members lying adjacent to and parallel with each other but spaced from each other by ends of like flat members engaged on only one of said two rods and similarly placed with said ends between said adjacent members so said adjacent members are spaced apart to provide multiple passageways through said bed.

24. A pressure filter comprising a tubular filter bed including a plurality of spaced rods arranged parallel to each other and equidistant from a common axis, and a plurality of substantially like flat strip members positioned on two of said rods with flat faces of adjacent members lying adjacent to and parallel with each other but spaced from each other by ends of like flat members engaged on only one of said two rods and similarly placed with said ends between said adjacent members so said adjacent members are spaced apart to provide multiple passageways through said bed, each of said members including an arcuate face corresponding to an arc struck with said axis as a center to provide said bed with a cylindrical face.

25. In a filter, a continuous filter bed to support a filter cake on the inside thereof; a cutter; means for moving said cutter toward said cake; and means for simultaneously rotating said cutter about its own axis and the axis of said bed to cut a peripheral portion from said cake.

26. In a filter, a filter bed in the form of a surface of revolution to support a filter cake on the inside thereof; a cutter; cutter support means; means for moving said cutter toward said cake; means for rotating said cutter support means over said cake to cut a peripheral portion of said cake; and means for rotating said cutter relative to said support means during rotation of said support means.

DALLAS R. TRINKLE.